Apr. 3, 1923.

A. E. NORRIS

AUTOMOBILE WINCH

Filed Aug. 12, 1920

Inventor:
Almon E. Norris.
Attys.

Apr. 3, 1923.  1,450,302
A. E. NORRIS
AUTOMOBILE WINCH
Filed Aug. 12, 1920  2 sheets-sheet 2
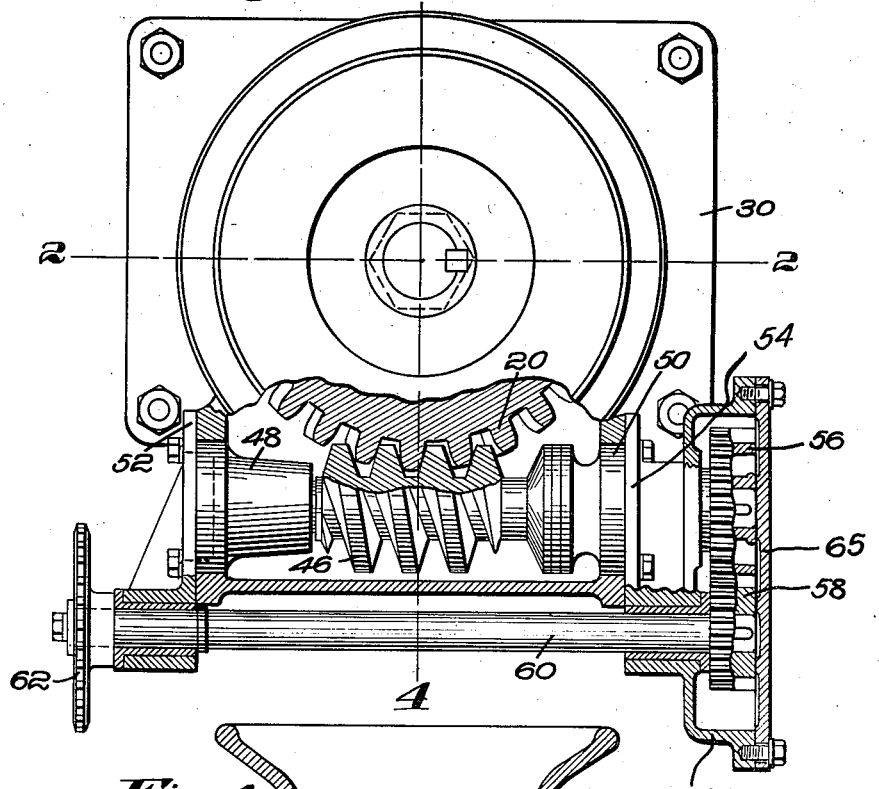
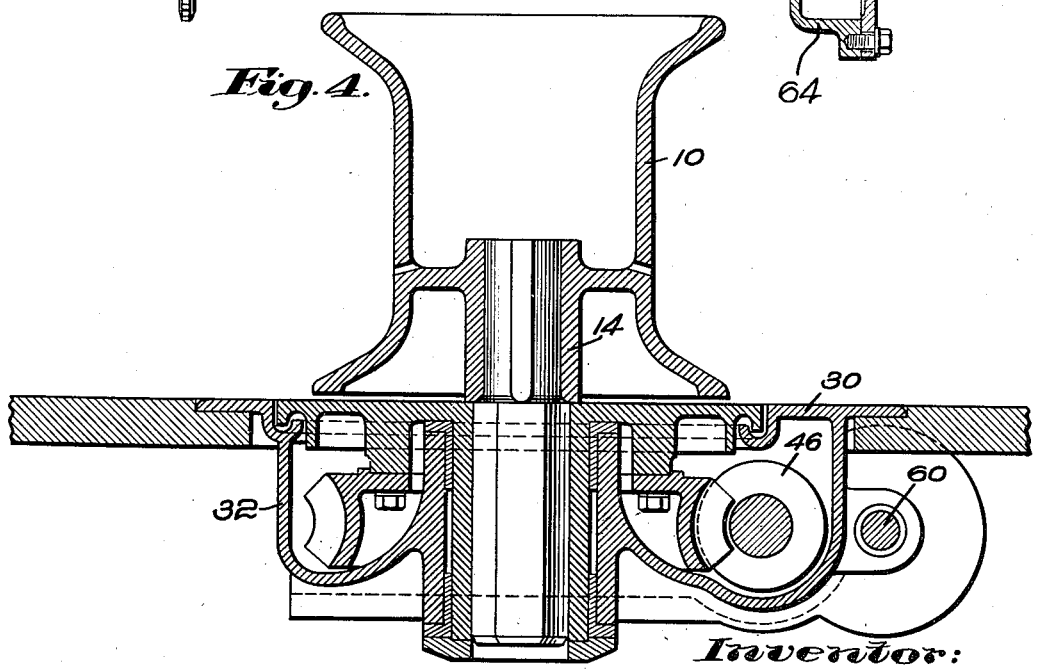
Inventor:
Almon E. Norris.

Patented Apr. 3, 1923.

1,450,302

UNITED STATES PATENT OFFICE.

ALMON E. NORRIS, OF BROOKLINE, MASSACHUSETTS.

AUTOMOBILE WINCH.

Application filed August 12, 1920. Serial No. 402,946.

*To all whom it may concern:*

Be it known that I, ALMON E. NORRIS, a citizen of the United States, and a resident of Brookline, county of Norfolk and State of Massachusetts, have invented an Improvement in Automobile Winches, of which the following description, in connection with the accompanying drawings, is a specification, like characters on the drawings representing like parts.

This invention relates to winches, and more particularly to winches adapted for use with automobiles.

The invention will be best understood with reference to the following description when taken in connection with the accompanying illustration of one specific embodiment thereof, while its scope will be more particularly pointed out in the appended claims.

In the drawings:

Fig. 3 is a plan view in partial section showing the winch and its support; and

Fig. 4 is a transverse sectional elevation on the line 4—4 in Fig. 3.

Figure 1:
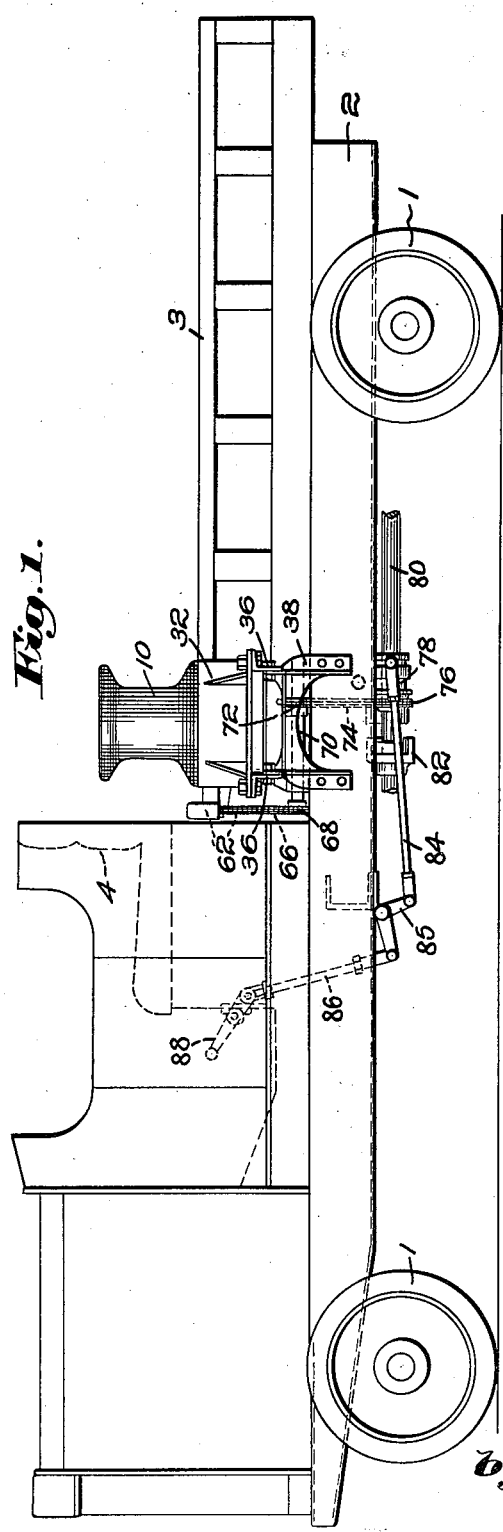
Figure 1 is a side elevation of an automobile equipped with a winch embodying one form of the invention.

Referring to the drawings and to the embodiment of the invention there shown, I have illustrated the same as applied to an automobile in the form of a motor truck of usual construction, having wheels 1, chassis 2, load supporting platform 3 and the driver's seat 4.

To facilitate the loading of the truck, or for other purposes where lifting, pulling or other application of power is required, the truck is provided with a power driven winch head 10, which is herein arranged in an upright position directly back of the driver's seat, midway the width of the platform 3, although any other suitable position or location of the winch head may be employed. With the winch head located as shown, or occupying any other position on the load supporting area of the platform, it reduces the load carrying capacity of the platform by the amount of the space which it occupies. In order that the entire load supporting area of the platform may be available when desired, while permitting the power driven winch head to be used when required, provision is herein made whereby the winch head may be readily removed from its supporting and driving mechanism and the latter is located out of substantial interfering relation to the load supporting area,— and herein substantially flush with the platform floor. When thus removed the winch head may be stored or carried on some other part of the vehicle and the entire load supporting area of the platform utilized, the construction being such that it may be quickly and readily replaced for use when and as desired.

Referring to the drawings and to the illustrative embodiment therein shown, the winch head 10, which may be of any suitable shape or construction, has projecting from its lower face a suitable driving member, herein in the form of a driving shaft 12 of the hexagonal cross section, this shaft being keyed or otherwise secured to a hub member 14 formed within the winch head 10. The hexagonal driving shaft 12 is adapted to fit into a similarly shaped socket presented by the driving sleeve 16, the latter being formed in the driving head 18, which is in the form of a turn-table preferably substantially flush with the floor of the platform of the truck. When the winch head is in position the driving shaft 12 fits the socket within the driving piece 16 and the lower end of the hub 14 rests on the face of the turn-table 18.

To drive the winch head, the driving head or turn-table 18 has secured thereto suitable driving means, herein in the form of a worm gear 20, bolted or otherwise secured to the under face of the turn-table, the latter being mounted to turn in a journal provided by the intermediate supporting frame 22. Preferably flanged bushings 24 and 26 are employed at opposite ends of the journal support and the driving head is assembled in the intermediate frame by means of the annular cap piece or flange 28, fastened to the under side of the socket piece 16.

Figure 2:
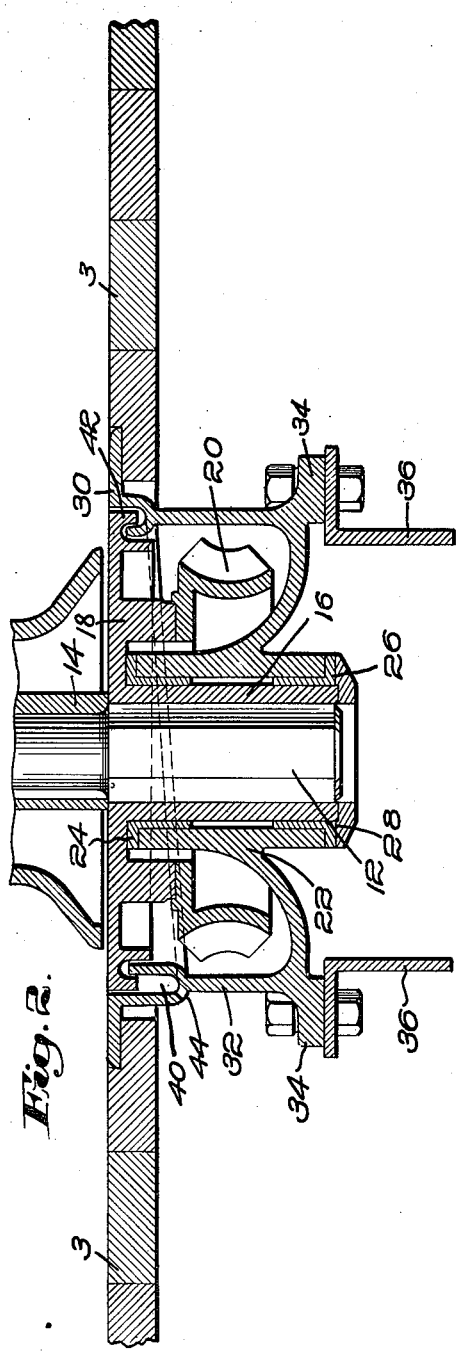
Fig. 2 is a longitudinal sectional elevation taken through the center of the winch support from front to rear, on the line 2—2 in Fig. 3.

The intermediate frame herein comprises a rectangular plate 30 with depending walls 32 which, in conjunction with the socket piece 16, form a substantially annular oil chamber enclosing the worm gear 20, the intermediate frame being in turn supported by means of lugs 34 (see Fig. 2) on a main transverse supporting frame. The latter comprises angle irons 36 extended transversely the truck and secured at opposite ends to arched frame members 38, which in turn are bolted or otherwise rigidly secured to the chassis frame. The entire support for the winch head in the illustrated embodiment of the invention, therefore, is secured rigidly to the chassis and independent of the floor or platform of the truck and in fixed and unvarying relation to the power driven mechanism of the truck although, if desired, the winch head may be mounted directly on the floor of the truck.

In order to keep water, grit or other foreign matter out of the oil chamber, suitable provision is herein made, the same consisting of an annular groove 40 formed in the intermediate frame 32, the peripheral edge of the driving head 18 having a down turned flange 42 which enters the groove and works between the two walls of the frame forming the groove. Any liquid or foreign matter which settles into the clearance space between the edge of the turntable and the upper face of the intermediate frame passes into the groove 40. The latter is formed on an inclination and at its lowermost point is provided with one or more drainage holes 44, so that the material thus entering the groove is flushed out or works out the drainage openings 44 and prevented from entering the oil chamber.

In order to drive the winch head a driving worm 46 is provided which is located in an off-set portion of the oil chamber (see Figs. 3 and 4) and is supported by journal members 48 and 50, which are carried by the cap pieces 52 and 54, respectively, bolted to the opposite sides of the off-set portion. The outer end of the worm gear shaft carries a driven pinion 56 meshing with the driving pinion 58, the latter carried by the counter-shaft 60 having at its opposite end a driving sprocket wheel 62. The counter-shaft 60 is journaled in bearings carried by the cap pieces 52 and 54, the latter also providing a support for the housing 64 which encloses the gears 56 and 58. The sprocket wheel 62 is driven preferably from the main driving mechanism of the truck through devices which permit its connection thereto or disconnection therefrom at will.

The housing 64 has a removable cover 65, the inner face of the cover being formed with bosses or hubs which contact with the outer face of the gears 56 and 58 and retain them in position. By removing the cover 65 the gears may be slipped off from their respective shafts and replaced by gears having different numbers of teeth and different speed ratios, this constituting speed change gearing whereby the speed and power of the winch may be varied to adapt it to different classes of work.

Herein the sprocket wheel 62 is connected by the sprocket chain 66 with the sprocket wheel 68 (see Fig. 1) on a counter-shaft 70, the latter journaled in the transverse frame members 36. The counter-shaft 70 has a sprocket wheel 72 connected by the sprocket chain 74 with a sprocket wheel 76, the latter rotatably fixed on a sliding clutch member 78 mounted on the main transmission shaft 80. The driving shaft 80 is free to rotate within the clutch member 78, but is non-rotatably related to the companion clutch member 82, and the clutch member 78 may be moved into engagement with the member 82 by means of the link 84, the bell crank lever 85, the link 86 and the controlling lever 88 near the driver's seat. By the described construction the driving mechanism for the winch may be thrown into or out of operation at will.

While for purposes of illustration I have herein shown and described in detail one specific embodiment of the invention, it is to be understood that the same is not limited to the details of construction and mechanical arrangement herein disclosed or to the precise adaptation herein described, but that extensive deviations may be made therefrom without departing from the spirit of the invention.

Claims.

1. The combination with a vehicle having a load-supporting platform, of a winch comprising a support presenting an upright bearing, a driving head journaled in and supported by said bearing and presenting an upright socket, and an upright winch-head supported and driven by said driving head and removable in an upward direction therefrom to render the space normally occupied by said winch-head available for occupation by a load on said platform.

2. The combination with a load-supporting platform, of a winch comprising an upright bearing, an upright driving head journaled in and supported by said bearing, and an upright winch-head supported by said driving head and having socketed driving connection therewith, whereby said winch-head may be removed in an upward direction therefrom to render the space normally occupied by said winch-head available for occupation by a load on said platform.

3. The combination with a chassis and a load-supporting platform thereon, of a winch comprising a support presenting a chamber and an upright bearing, an upright driving head journaled in said bearing and supported by said support, means within said chamber for rotating said head, and an upright winch-head normally occupying a portion of the load-supporting area of said platform, supported by said driving head, and having socketed driving connection therewith, whereby said winch-head may be removed in an upward direction therefrom to render the space normally occupied by said winch-head available for occupation by a load on said platform.

4. The combination with a chassis and a load-supporting platform thereon, of a winch comprising a support presenting a chamber and an upright bearing, an upright driving head supported by said support, journaled in said bearing and carrying a cover for said chamber, means within said chamber for rotating said head, and an upright winch-head normally occupying a portion of the load-supporting area of said platform, supported by said support and having socketed driving connection therewith, whereby said winch head may be removed in an upward direction therefrom to render the space normally occupied by said winch-head available for occupation by a load on said platform.

5. The combination with a chassis having a frame and a load-supporting platform above and supported by said frame, of a winch comprising a support mounted on said frame below said platform and presenting an upright bearing, an upright driving head supported by said support and journaled in said bearing, and an upright winch-head normally occupying a portion of the load-supporting area of said platform, having socketed driving connection with said driving head, whereby said winch-head may be removed in an upward direction therefrom to render the space normally occupied by said winch-head available for occupation by a load on said platform.

6. The combination with an automobile having a load supporting platform, of an upright winch head thereon, a rotatable driving head located below the point of substantial interference with the load supporting area, a casing for said driving head providing an oil chamber, driving gearing within said casing, and means for draining away from said casing liquid or other material gravitating down around the edges of said driving head.

7. The combination with an automobile having a load supporting platform, of an upright winch head thereon, a rotatable driving head located below the point of substantial interference with the load supporting area, a casing for said driving head providing an oil chamber, driving gearing within said casing, said driving head having a flanged edge, and a drainage groove in which the flanged edge of said driving head turns.

8. In an automobile, the combination of an upright winch head, a rotatable driving member for said winch head, driving gearing, an oil chamber for said driving gearing, said rotatable driving member having a downwardly turned flange, and a supporting frame providing a groove in which said flanged edge of said driving member turns.

9. The combination with a vehicle having a chassis and a load-supporting platform thereon, of a winch comprising a frame supported by said chassis and presenting an upright bearing below the top of said platform, a driving head journaled in and supported by said bearing and presenting an upright socket, and a winch-head normally occupying a portion of the load-supporting area of said platform and presenting a part normally received in and driven by said socket and removable in an upward direction therefrom to render the space normally occupied by said winch-head available for occupation by a load.

10. The combination with a vehicle having a chassis and a load-supporting platform thereon, of a winch comprising a frame extending transversely of and having its ends supported by said chassis, said frame presenting an upright bearing below the top of said platform, a driving head journaled in and supported by said bearing and presenting an upright socket below the top of said platform, and a winch head normally occupying a portion of the load-supporting area of said platform and presenting a part normally received in and driven by said socket and removable in an upward direction therefrom to render the space normally occupied by said winch-head available for occupation by a load.

11. The combination with a chassis and a load-supporting platform thereon, of a winch comprising a frame supported by said chassis, presenting a chamber and an upright bearing below the top of said platform, a driving head journaled in and supported by said bearing, presenting a socket below the top of said platform and a cover for said chamber, means within said chamber for rotating said driving head, and a winch-head normally occupying a portion of the load-supporting area of said platform and presenting a part normally received in and driven by said socket and removable in an upward direction therefrom to render the space normally occupied by said winch-head available for occupation by a load.

In testimony whereof, I have signed my name to this specification.

ALMON E. NORRIS.